Nov. 16, 1965  P. C. KEITH, JR  3,217,502
LIQUEFACTION OF AIR
Filed April 22, 1963
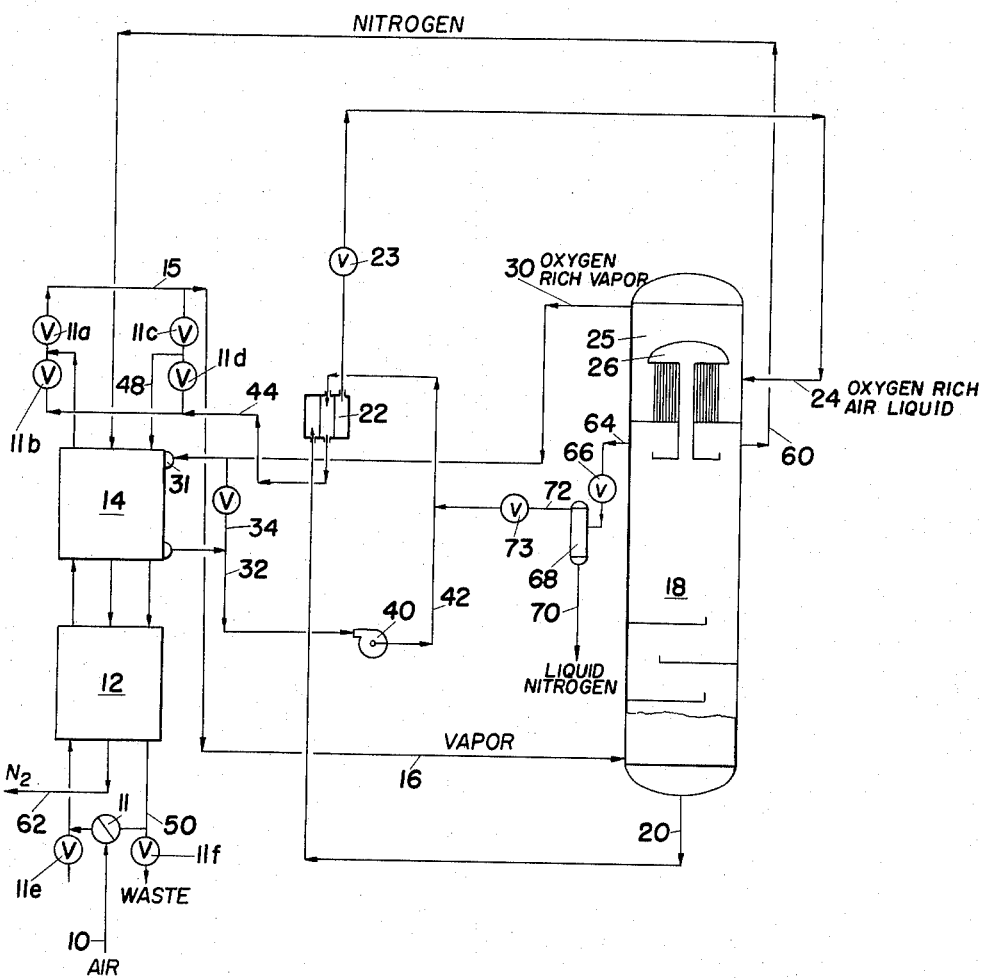
INVENTOR.
PERCIVAL C. KEITH Jr.
BY Nathaniel Ely
ATTORNEY ়
United States Patent Office 3,217,502
Patented Nov. 16, 1965

3,217,502
LIQUEFACTION OF AIR
Percival C. Keith, Jr., Skillman, N.J., assignor to Hydrocarbon Research, Inc., New York, N.Y., a corporation of New Jersey
Filed Apr. 22, 1963, Ser. No. 274,613
6 Claims. (Cl. 62—13)

This invention relates to the liquefaction and fractionation of air for the purpose of producing high purity nitrogen in gaseous and/or liquid form with the gas available at a relatively substantial pressure.

In the liquefaction and fractionation of air as practiced for many years, the usual objective has been to produce oxygen, and generally the nitrogen was considered a waste product and was discharged from the system. However, the recovery of nitrogen in substantial quantities from the usual air liquefaction plant has proved to be very expensive due to the low recovery, excessive requirements for added refrigerant and supplemental compressors, particularly when the product nitrogen must be supplied under pressure.

In accordance with my invention, I have found it possible to materially reduce equipment and operating costs for producing the desired nitrogen by introducing the feed air at a somewhat higher than usual pressure and after recovery of the nitrogen the entire quantity of oxygen rich air is expanded to produce the necessary refrigeration for the system. By the use of reversing exchangers and a multiple pressure fractionator, a high purity nitrogen is available at the desired high pressure without further compression or other refrigeration and a bleed stream of the oxygen rich air can be produced as the unbalance stream.

The main object of my invention is to economically recover nitrogen from air in a unique air liquefaction system.

Further objects and advantages of my invention will appear from the following description of a preferred form of embodiment of such invention, and as more particularly shown in the attached drawing which is a schematic flow sheet of an air liquefaction plant.

In the attached drawing, air, under ambient conditions of temperature and usually containing moisture and objectionable contaminating gases, is supplied to the system at 10 at a pressure of five to eight atmospheres.

The high pressure air passes through a suitable reversing valve 11, and, blocked by valve 11e, is subsequently passed through heat exchangers 12 and 14, and thence being blocked by valve 11b, passes through valve 11a, ultimately discharging at 15 at a relatively low temperature such as in the order of −260° F. This air blocked by valve 11c then passes through line 16 directly to the bottom of the fractionating column 18. This column may be of the typical bubble tray or packed column type and is operated with a corresponding bottom pressure in the range of five to eight atmospheres.

In the presence of reflux, formed as hereinafter described, oxygen rich liquid air discharges at 20 from the bottom of column 18 and passes through heat exchanger 22, expansion valve 23, and thence through line 24 to the condenser section 25 of the tower 18. When this liquid contains hydrocarbons such as acetylene, it usually passes through silica gel absorbers, not shown, in the usual manner.

The condenser 26, in cooling the air vapors to form reflux, vaporizes the oxygen rich liquid air to produce oxygen rich air vapors which are discharged at 30, and are subsequently expanded to furnish the desired refrigeration. A part may be used as an unbalance heating line at 31 in exchanger 14. The oxygen rich vapors discharging at 32 from the unbalance line, and from the line 34, then pass through the expander 40. The low pressure vapors and any liquid formed by this expansion discharge through the line 42 and serve to cool the rich air in line 20 in exchanger 22. The oxygen rich air then discharges through line 44 and reversing valve 11d through the line 48 and through the exchangers 14 and 12 to the waste line 50 and valve 11f. The heat exchange with the incoming air produces a waste gas temperature of about 96° F.

It will be understood that the reversing exchangers 12 and 14 are provided with timer controls to reverse the valves 11, 11a, 11b, 11c, 11d, 11e, and 11f at desired intervals to remove impurities that tend to deposit on the surfaces. It will also be understood that inter-line heat exchange will be accomplished where necessary or desirable to permit control of temperature in the desired locations. These features, however, are considered to be within the skill of the art and are omitted in favor of simplifying the flow diagram.

The high pressure air which enters the fractionating tower 18 in the presence of reflux generated by the condenser 26 yields a relatively pure nitrogen vapor product at 60. This passes through a non-reversing path in the heat exchangers 14 and 12 and discharges at 62 as a high purity nitrogen vapor. Under the designed conditions, a temperature in the order of 96° F. is attained for this stream.

I find that by the increase in pressure of the air to the extent of only about twenty pounds per square inch over the desired outlet pressure of the nitrogen vapor stream, and by expanding in excess of fifty percent of the oxygen rich vapors in the turbo-expander there is adequate refrigeration, not only for the fractionation but also for the impurity removal in the reversing exchangers.

If liquid nitrogen is required, a portion of the nitrogen vapor discharging at 64 passes through the expansion valve 66 with the resulting flash into chamber 68 from which a liquid nitrogen fraction can be removed at 70. The balance of the nitrogen vapors pass through the line 72 and valve 73 into the waste oxygen rich vapor line 42 as heretofore mentioned and are thus passed to waste.

With a system of this type, it will be apparent that while the initial air pressure is somewhat higher than customary, all of the oxygen rich air from the high pressure tower is subsequently expanded. It is found that the expander 40 need not be of high efficiency due to this greater volume, and less air is used tan has heretofore been required and the nitrogen product is available at high pressure. When using an expander of as little as 75% efficiency, approximately 5% of the nitrogen can be delivered as liquid.

The significance of this is indicated in a comparison with a typical air liquefaction plant as follows:

TABLE 1

*Nitrogen generators*
TABLE OF COMPARISON
[Basis: 100 m./hr. N₂ product (33.6 t./d.)]

| Type Cycle | Standard | Proposed |
|---|---|---|
| Air to Plant: | | |
| m./hr | 321.0 | 250.0 |
| MM s.c.f.d | 2.93 | 2.28 |
| Compressor Discharge, p.s.i.a | 90.0 | 125.0 |
| Air Comp. Utility, kw | 308.0 | 285.0 |
| Process Variables: | | |
| Expander Flow, MM s.c.f.d | 0.803 | 1.37 |
| Inlet/Outlet Press., p.s.i.a | 87/18.5 | 60/19 |
| Assumed Exp. Efficiency, Percent | 75.0 | ¹ 45.0 |
| Separation Tower Variables: | | |
| Oper. Press., p.s.i.a | 85.0 | 120.0 |
| N₂ Recovery Based on air, Feed, Percent | 31.2 | 40.0 |
| Rich Air Comp., Percent O₂ | 35.9 | 35.0 |

¹ Minimum required.

The circuit has an especial advantage with relatively small to medium size nitrogen plants having a capacity in the order of 20 to 100 tons per day.

While I have shown a preferred form of embodiment of my invention, I am aware that modifications may be made thereto and I, therefore, desire a broad interpretation of my invention within the scope and spirit of the description herein and of the claims appended hereinafter.

I claim:

1. The method of recovering high purity nitrogen vapor under superatmospheric pressure from air which comprises cooling, in reversing exchangers, a relatively high pressure air feed nearly to the liquefaction point, passing said cooled high pressure air without substantial pressure drop to a distillation zone and condensing therein, in the presence of reflux, a part of said air to produce an oxygen rich liquid and a gaseous nitrogen stream, sub-cooling said oxygen rich liquid in heat exchange with a cold waste gas stream, expanding said sub-cooled oxygen rich liquid and passing it in heat exchange with the gaseous nitrogen stream to form the above mentioned reflux and to vaporize an oxygen rich vapor stream, heat exchanging said oxygen rich vapor stream against air entering said reversing exchangers, expanding said oxygen rich vapor stream with the accomplishment of work, partially heating said oxygen rich vapor stream by heat exchange with said oxygen rich liquid, and discharging said partially heated oxygen rich vapor stream to atmosphere after heat exchange in the reversing exchangers with the incoming air, and passing said gaseous nitrogen stream through said reversing exchangers without substantial pressure drop to produce a relatively high pressure nitrogen vapor.

2. The method of recovering nitrogen as claimed in claim 1 wherein the oxygen rich vapors supply the unbalance heat for the reversing exchangers.

3. The method of recovering nitrogen as claimed in claim 1 wherein the nitrogen vapors are flashed to produce liquid nitrogen.

4. The method of recovering nitrogen vapors from air as claimed in claim 1 and to produce liquid nitrogen which comprises the further step of expanding and flashing a portion of said gaseous nitrogen stream to form a sub-cooled liquid portion.

5. The method of recovering high purity nitrogen vapor from air as described in claim 1 and wherein the air is supplied to the system at a pressure of 5 to 8 atmospheres and the nitrogen vapor is recovered without material pressure drop.

6. The method of recovering nitrogen vapors as claimed in claim 1 wherein the heat exchange between the inlet air and exiting waste stream is accomplished in reversing heat exchangers and a portion of the oxygen rich vapor is diverted around the heat exchangers and is combined with the remaining portion of oxygen rich vapors after the said heat exchange and before the expansion.

References Cited by the Examiner
UNITED STATES PATENTS

| | | | |
|---|---|---|---|
| 2,537,046 | 1/1951 | Garbo | 62—15 XR |
| 2,586,811 | 2/1952 | Garbo | 62—39 XR |
| 2,663,168 | 12/1953 | Schilling | 62—13 XR |
| 2,850,880 | 9/1958 | Jakob | 62—13 XR |
| 2,866,321 | 12/1958 | Fuchs | 62—13 |
| 3,039,274 | 6/1962 | Matsch | 62—13 XR |
| 3,070,966 | 1/1963 | Ruhemann | 62—29 |

NORMAN YUDKOFF, *Primary Examiner.*